(12) United States Patent
Devitt et al.

(10) Patent No.: US 6,612,600 B2
(45) Date of Patent: Sep. 2, 2003

(54) BRAZED BICYCLE FRAME AND METHOD FOR MAKING

(76) Inventors: Mike Devitt, 140 E. 14th Ave., Escondido, CA (US) 92025; Carl W. Schonfeld, 452 Marview Dr., Solana Beach, CA (US) 92075-1326

( * ) Notice: Subject to any disclaimer, the term of this patent is extended or adjusted under 35 U.S.C. 154(b) by 0 days.

(21) Appl. No.: 09/841,529

(22) Filed: Apr. 24, 2001

(65) Prior Publication Data

US 2001/0028158 A1 Oct. 11, 2001

Related U.S. Application Data

(63) Continuation-in-part of application No. 09/431,878, filed on Nov. 2, 1999, now Pat. No. 6,386,567, which is a continuation-in-part of application No. 09/049,266, filed on Mar. 27, 1998, now Pat. No. 5,975,550.

(51) Int. Cl.[7] .................................................. B62K 1/00
(52) U.S. Cl. ..................................... 280/288.3; 228/246
(58) Field of Search ............................. 280/281.1, 288, 280/288.3; 228/56.3, 245, 246, 254

(56) References Cited

U.S. PATENT DOCUMENTS

| | | | | | |
|---|---|---|---|---|---|
| 589,868 A | * | 9/1897 | Spruce et al. | ............. | 280/281.1 |
| 2,602,413 A | * | 7/1952 | Miller | ........................ | 428/654 |
| 2,827,306 A | * | 3/1958 | Roder | ...................... | 280/288.3 |
| 3,147,089 A | * | 9/1964 | Chyle | .......................... | 428/655 |
| 3,233,916 A | * | 2/1966 | Bowden | .................. | 280/288.3 |
| 3,454,374 A | * | 7/1969 | Domin | ....................... | 428/642 |
| 4,550,927 A | * | 11/1985 | Resele | ..................... | 280/281.1 |
| 4,967,315 A | * | 10/1990 | Schelhorn | .................. | 361/818 |
| 5,464,240 A | * | 11/1995 | Robinson et al. | ........ | 280/281.1 |

* cited by examiner

Primary Examiner—Brian L. Johnson
Assistant Examiner—Bryan Fischmann
(74) Attorney, Agent, or Firm—John R. Ross; John R. Ross, III

(57) ABSTRACT

A brazed bicycle frame and method for making. At least two bicycle frame half-shells are fabricated. A filler metal is then placed between the bicycle frame half-shells to form a two-part hollow frame section. The two-part hollow frame section is inserted into a hot volume at a temperature higher than the melting temperature of the filler metal but lower than the melting temperature of the two bicycle frame half-shells. The filler metal is allowed to melt. The filler metal is then allowed to cool and harden to form a rigid joint. Preferably, the bicycle frame half-shells each have a flange that facilitates alignment fixturing and assembly of the two-part hollow frame sections. Also it is possible for the filler metal and the bicycle frame half-shells to be placed in an extruded or formed grooved section. The grooved section also facilitates alignment fixturing and assembly of the two part hollow frame sections, and helps to strengthen the braze joint.

20 Claims, 7 Drawing Sheets

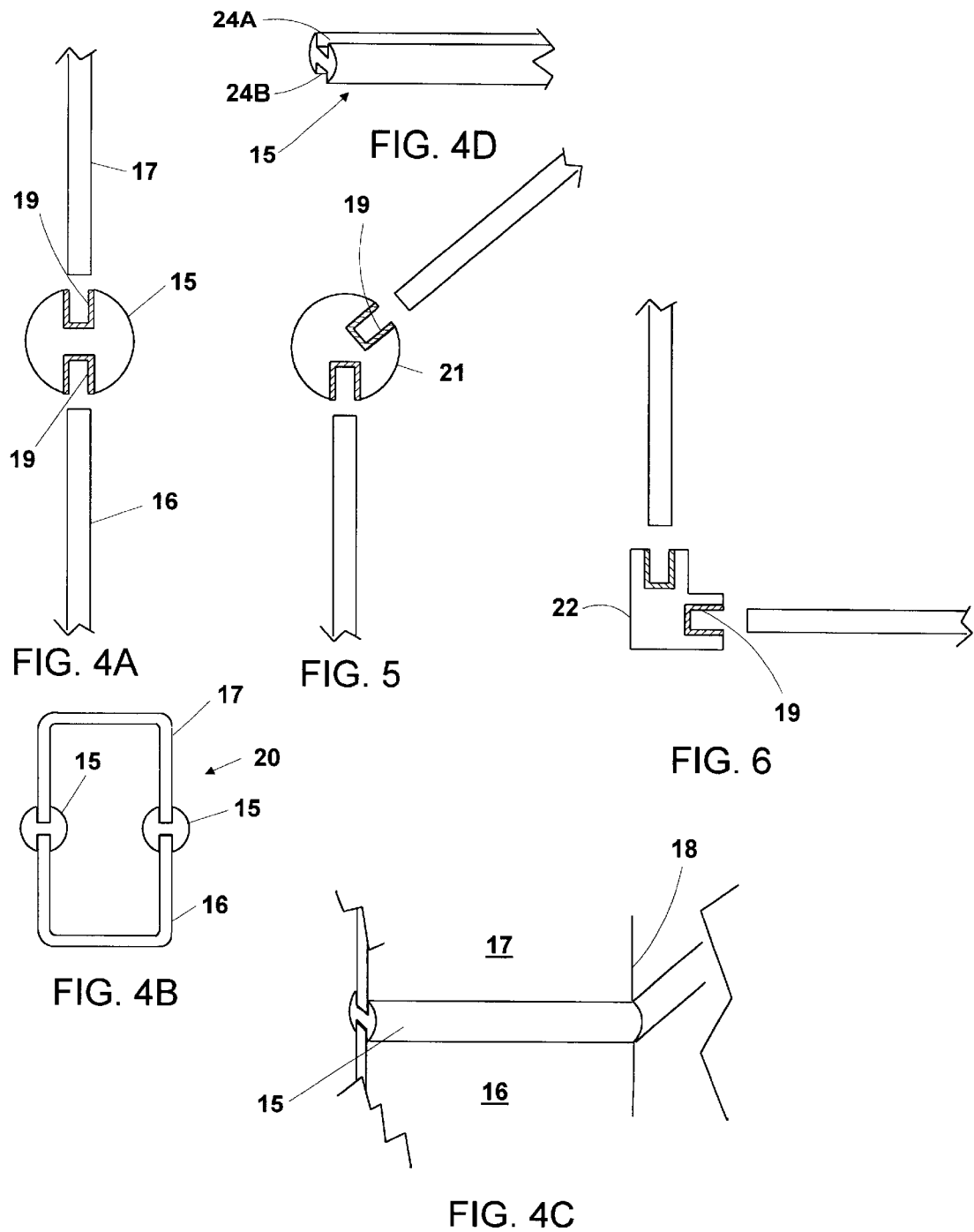

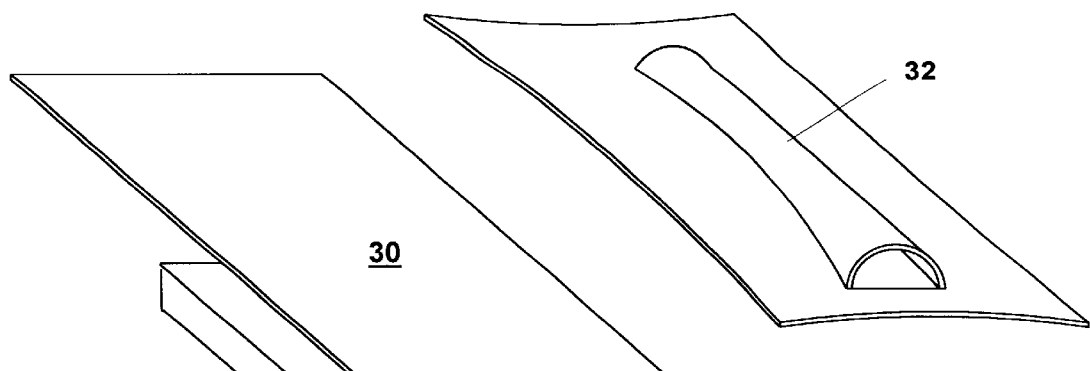
FIG. 7
FIG. 8
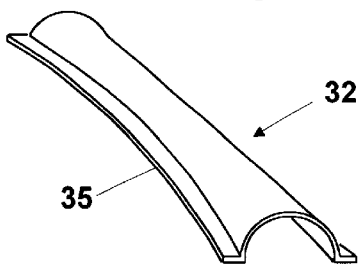
FIG. 9
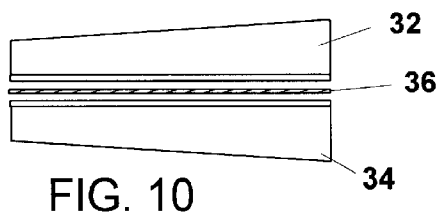
FIG. 10
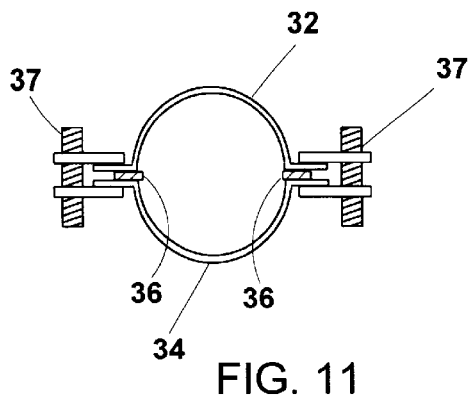
FIG. 11

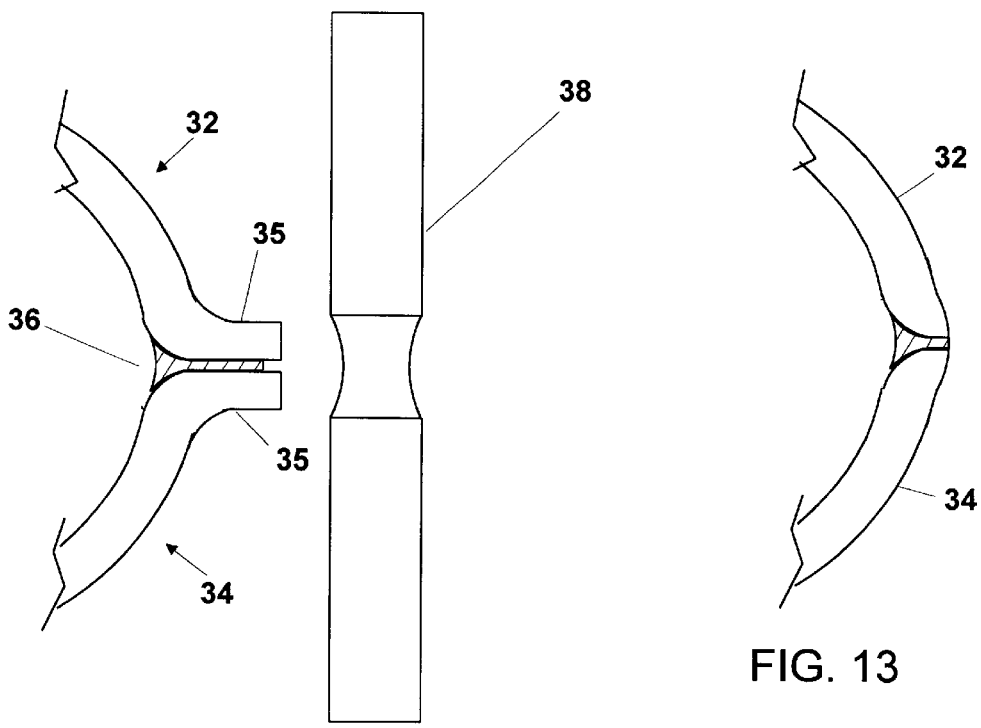
FIG. 12
FIG. 13
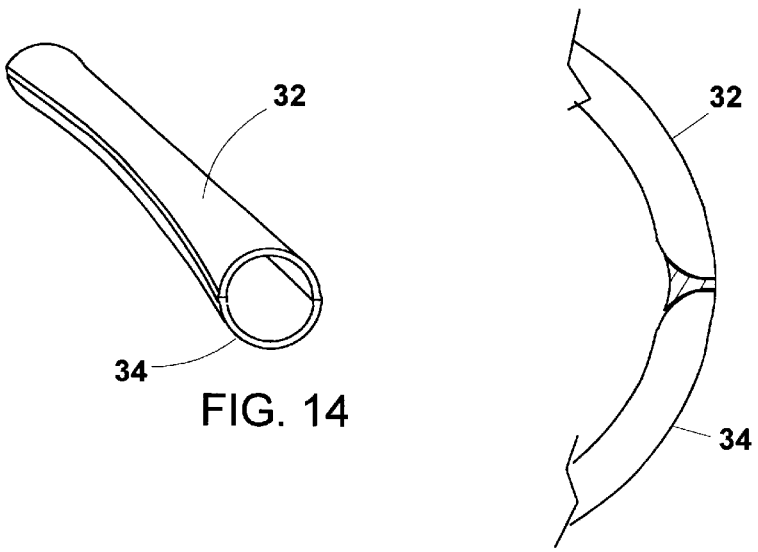
FIG. 14
FIG. 15

BRAZED BICYCLE FRAME AND METHOD FOR MAKING

This application is a continuation-in-part of patent application Ser. No. 09/431,878 filed on Nov. 2, 1999, now U.S. Pat. No. 6,386,567, which is a continuation-in-part of patent application Ser. No. 09/049,266, filed on Mar. 27, 1998, now U.S. Pat. No. 5,975,550.

BACKGROUND OF THE INVENTION

The history of the bicycle goes back many years. A crude two-wheeled vehicle propelled by the feet was popular as early as the second half of the $17^{th}$ century. Extensive developments to the design of the bicycle were made during the $19^{th}$ century. At the end of the $19^{th}$ century, the bicycle had become a serious means of transportation. In 1899, the U.S. production of about 1,000,000 bicycles a year was valued at $31,000,000. However, by 1909 the bicycle industry in the U.S. was nearly nonexistent due to the advent of the motorcycle and automobile. Bicycle riding was generally confined to children and to small groups of devotees, such as members of the League of American Wheelmen, organized in 1880 and the Century Road Club Association, organized in 1899.

It was not until the 1960's and 1970's and more recently in the 1990's that bicycling once again began to enjoy strong popularity. There are several modem reasons that may have resulted in this strong resurgence. Air pollution, traffic congestion, and the high cost of automobile fuel are all reasons that it makes sense to use a bicycle for transportation. Personal fitness is also a modem trend that is very popular. The bicycle is an outstanding device to use for physical exercise.

As the bicycle has developed and has become firmly established as part of our modem culture, its use has expanded in recent years. For example, in addition to the traditional road bicycle, mountain bikes and BMX bikes are now very popular.

Bicycle Frames

As bicycle frame technology has improved, bicycle designers have focused on making bicycle frames that are lightweight and strong. Similarly, bicycle designers are concerned about building bicycle frames in a cost effective and time efficient manner. Monocoque bicycle frames are extremely popular for road, mountain, and BMX bicycles. A monocoque structure is one in which the skin absorbs all or most of the stresses to which the structure is subjected.

There are two common methods for making a hollow monocoque bicycle frame. The first method is by extruding individual hollow tubular frame sections. These frame sections can then be cut to length, bent to a desired shape, coped, aligned and then individually welded together to produce a bicycle frame. Some of the major disadvantages to making bicycle frames in this manner are: 1) the manufacturer is limited by available extruded tubing material and sizes, 2) the thickness and cross section of the tube cannot vary with stress, 3) the amount and type of bending and coping that he is able to do to the extruded frame sections, and 4) the extra time it takes to individually align and weld each frame member together, and 5) the time necessary to align each frame after welding.

The second known method involves forming matching frame half-shells and then welding them together along their entire seam. The advantage of the second method over the first is that the cross sectional area of the welded frame sections can vary along their length. However, welding formed matching half-shells along their entire seam is a time consuming and complicated process. Because welding a bicycle frame is considered to be delicate work, welders have to be highly trained or high cost robotic welders are used to do an effective, consistent and esthetically acceptable job. Therefore, it is much more expensive to weld formed matching half-shells together than it is to extrude individual frame sections and then weld those together.

Brazing

Brazing is a method of joining together metals by inserting the entire work into a hot volume (such as a molten salt bath or a hot furnace) and using a filler metal with a melting point lower than that of the metals to be joined. Brazing is well known in the prior art.

What is needed is a more efficient method for making monocoque bicycle frames.

SUMMARY OF THE INVENTION

The present invention provides a brazed bicycle frame and method for making. At least two bicycle frame half-shells are fabricated. A filler metal is then placed between the bicycle frame half-shells to form a two-part hollow frame section. The two-part hollow frame section is inserted into a hot volume at a temperature higher than the melting temperature of the filler metal but lower than the melting temperature of the two bicycle frame half-shells. The filler metal is allowed to melt. The filler metal is then allowed to cool and harden to form a rigid joint. In one preferred embodiment the bicycle frame half-shells each have a flange that facilitates alignment fixturing and assembly of the two-part hollow frame sections. In another preferred embodiment the filler metal and the bicycle frame half-shells are placed in an extruded or formed grooved section. The grooved section also facilitates alignment fixturing and assembly of the two part hollow frame sections, and helps to strengthens the braze joint.

BRIEF DESCRIPTION OF THE DRAWINGS

FIGS. 4A–4D show a procedure for making a preferred embodiment of the present invention.

FIG. 5 shows another preferred embodiment of the present invention.

FIG. 6 shows another preferred embodiment of the present invention.

FIGS. 7–14 show a procedure for making another preferred embodiment of the present invention.

FIG. 15 shows another preferred embodiment of the present invention.

DETAILED DESCRIPTION OF THE PREFERRED EMBODIMENTS

Preferred embodiments of the present invention can be described by reference to FIGS. 1–17.

Brazing a Bicycle Frame

Figure 1:
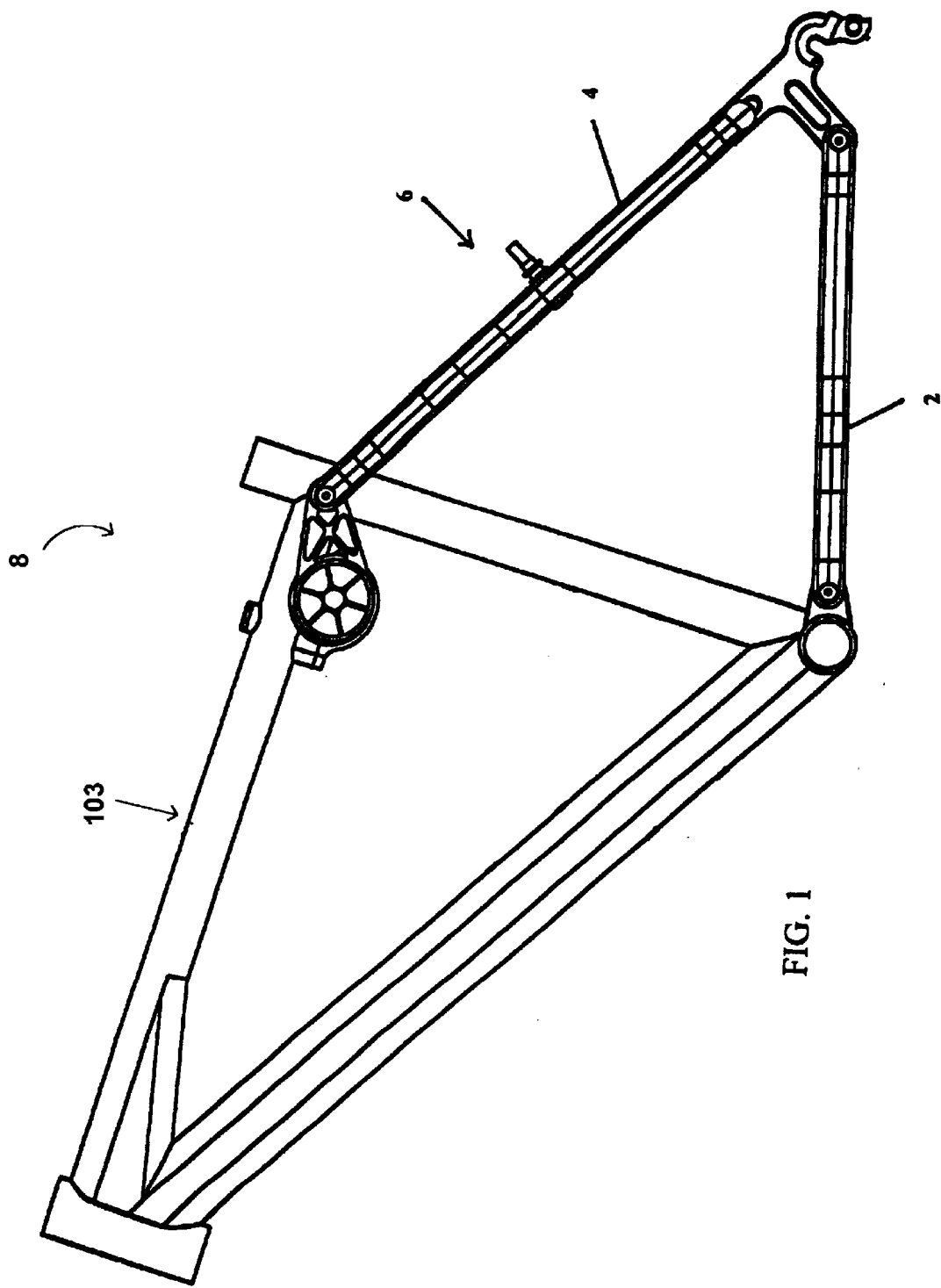
FIG. 1 shows a bicycle frame in which the rear portion of the frame has been brazed.
Figure 2:
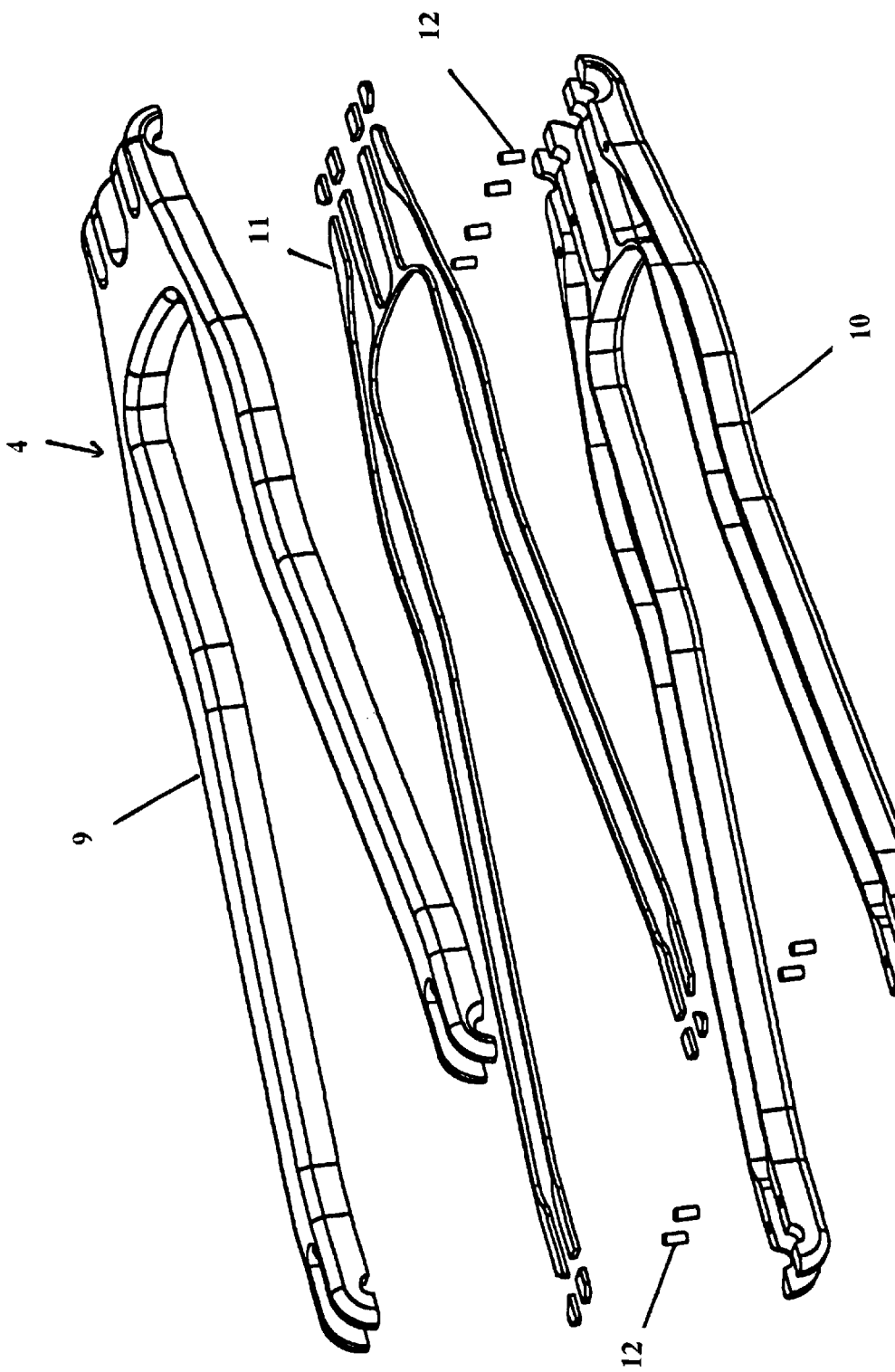
FIG. 2 shows an upper frame half-shell and a lower frame half-shell and filler metal.
Figure 3:
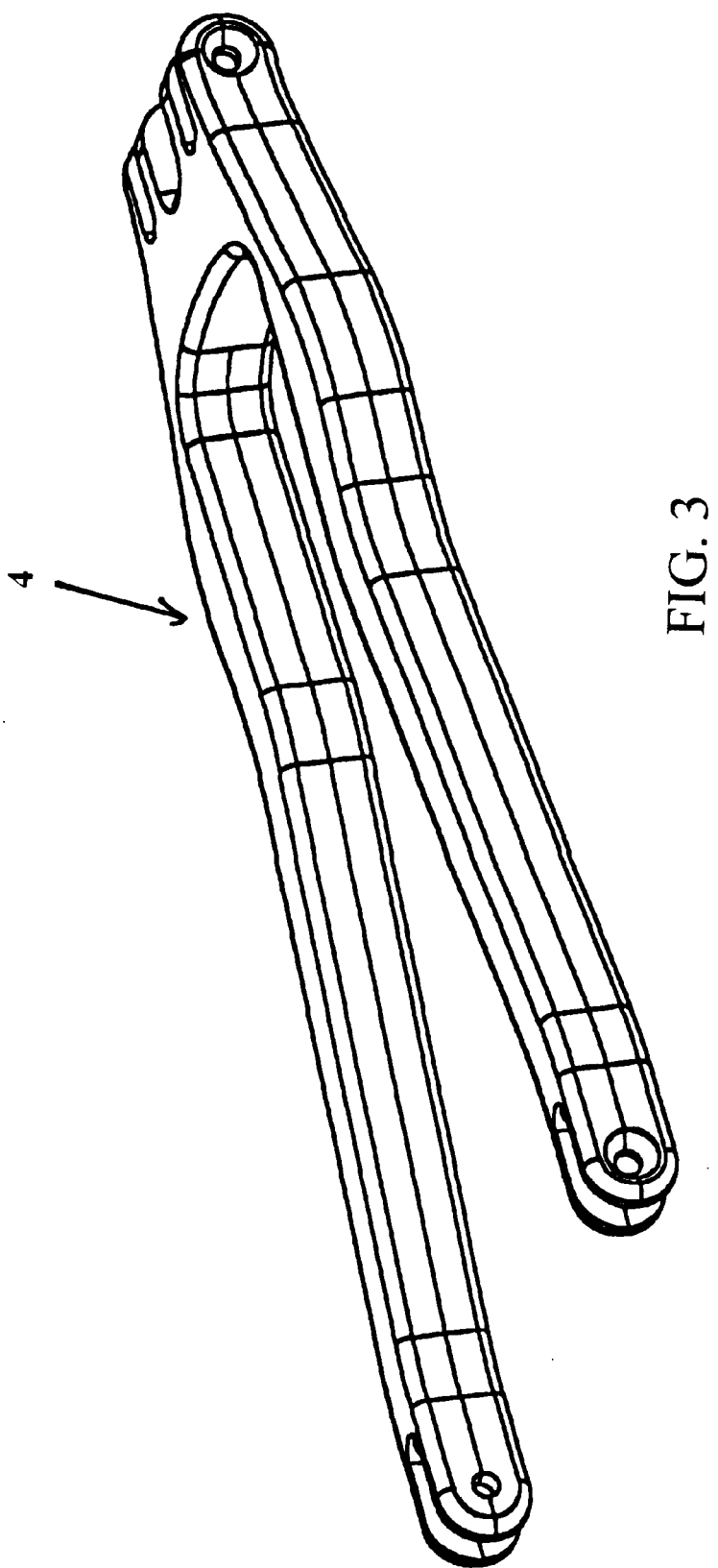
FIG. 3 shows the components shown in FIG. 2 brazed together.
Figure 16:
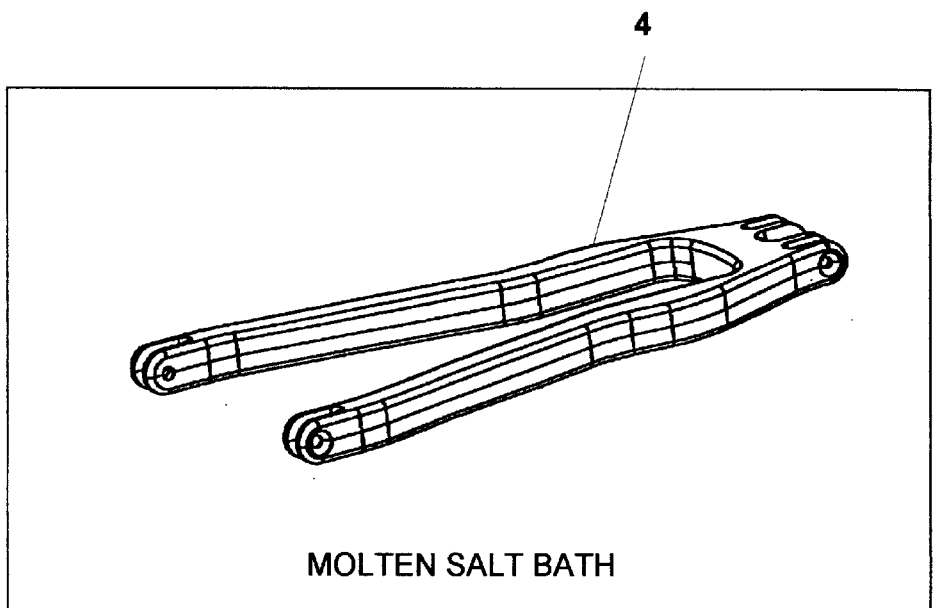
FIG. 16 shows a preferred two-part frame section being inserted into a molten salt bath.

FIG. 1 shows a side view of a first preferred embodiment of the present invention in which chain stay 2 and seat stay 4 of rear portion 6 of bicycle frame 8 have been brazed. FIG. 2 shows a detailed view of the components of seat stay 4 prior to it being brazed. To braze seat stay 4, upper frame half-shell 9 and lower frame half-shell 10 are first cleaned. Then, braze filler metal 11 is placed between upper frame half-shell 9 and lower frame half-shell 10 and the two halves are assembled. In a preferred embodiment, the upper and lower frame half-shells are aluminum alloy and filler metal 9 is an aluminum brazing alloy. Connecting pins 12 help align and assemble upper frame half-shell 9 appropriately with lower frame half-shell 10. After the two halves are assembled, seat stay 4 appears as shown in FIG. 3. As shown in FIG. 16, seat stay 4 is then inserted into a heated volume at approximately 1,400 degrees Fahrenheit to melt the aluminum alloy braze filler metal 11. In a preferred embodiment the heated volume is a molten salt bath. Seat stay 4 is then removed from the molten salt bath and it cools. Consequently, filler metal 11 re-hardens, brazing together upper frame half-shell 9 and lower frame half-shell 10.

Similarly, front portion 103 of bicycle frame 8 can also be brazed from two halves. By referring to FIG. 2, the advantages of brazing are made very clear. The manufacturer is exact shape and thickness he needs for the bicycle frame section. Also, many frame sections and joints can be simultaneously and uniformly brazed at once in the same heated volume, saving time and money in the construction process. Furthermore brazing uniformly heats the frame sections minimizing distortion and eliminating the need for alignment after brazing.

Grooved Brazing Method

A second preferred embodiment is shown in FIGS. 4A–4D. As shown in FIG. 4A, grooved section 15 is aligned with upper frame half-shell 17 and lower frame half-shell 16. A preferred grooved section 15 is shown in FIG. 4D. In the second preferred embodiment, grooved section 15 is extruded 6061 aluminum and is approximately ¼ inch in diameter. Grooves 24A and 24B are rectangular and have a width of approximately 0.07 inch. Upper frame half-shell 17 and lower frame half-shell 16 are also preferably 6061 aluminum and are approximately 0.063 inch thick. As shown in FIG. 4A, the cross section of grooved section 15 is in the general shape of an H-section. Braze filler metal 19 is placed in grooves 24A and 24B. Braze filler metal 19 is preferably an aluminum brazing alloy. Upper frame half-shell 17 and lower frame half-shell 16 are then assembled together by inserting them into grooves 24A and 24B in grooved section 15 to form joined frame section 20, as shown in FIG. 4B. Grooved sections 15 holds upper frame half-shell 17 and lower frame half-shell 16 in assembled alignment as shown in FIGS. 4B and 4C. Note that in FIG. 4C, upper frame half-shell 17 and lower frame half-shell 16 bend at bend 18. Grooved section 15 is pliable and therefore it can be bent so that it adjusts easily to the shape of the upper and lower halves.

The second preferred embodiment provides a significant time savings because grooved section 15 automatically aligns upper frame half-shell 17 so that it is positioned directly above lower frame half-shell 16. In the second preferred embodiment, prior to applying heat to frame section 20, upper frame half-shell 17 and lower frame half-shell 16 are secured together to ensure that their desired mating relationship does not alter during the brazing process. A preferred method of securing them together is with the use of clamps. Then, upper frame half-shell 17 and lower frame half-shell 16 are heated and are brazed together in a manner similar to that described in the first preferred embodiment.

Although FIGS. 4A–4C show grooved section 15 resembling an H-section in which the grooves are directly opposite one another, it is also possible to adjust the grooves so that they are at other angles. FIG. 5 shows grooved section 21 where the upper groove is angled to the left of the lower groove. FIG. 6 shows grooved section 22 in which the grooves are at 90 degrees to one another.

Flanged Half-Shell Brazing Method

A third preferred embodiment is shown in FIGS. 7–14.

Forming Flanged Half-Shells

In the third preferred embodiment, a flat section of any brazable sheet metal 30 (such as aluminum, stainless steel, or titanium) is formed into a half shell by mold 31. In the preferred embodiment, sheet metal 30 is 6061 aluminum and is approximately 0.050 inch thick. Forming pressure is imparted to the top of sheet metal 30 causing it to assume the shape of mold 31 and become upper frame half-shell 32, as shown in FIG. 8. If necessary, excess aluminum is cut away, leaving flange 35 around upper frame half-shell 32. Preferably, flange 35 extends approximately ¾ inch out from the outside edge of upper frame half-shell 32 to allow for clamping or the creation of other alignment, fixturing or assembly features. In a similar fashion a matching lower frame half-shell 34 is formed (FIG. 10).

Assembling then Brazing the Flanged Half-Shells

As shown in FIG. 10, upper frame half-shell 32 is aligned and assembled to lower frame half-shell 34. Braze filler metal 36 is placed between upper frame half-shell 32 and lower frame half-shell 34. FIG. 11 shows a front view of upper frame half-shell 32 secured together with clamps 37 to lower frame half-shell 34 with braze filler metal 36 in between. In a preferred embodiment, braze filler metal 36 is pasted between upper frame half-shell 32 and lower frame half-shell 34. Clamps 37 are then tightened and upper frame half-shell 32 and lower frame half-shell 34 are heated and brazed together in a manner similar to that described in the first preferred embodiment.

Removing the Flange

After upper frame half-shell 32 and lower frame half-shell 34 have been heated and filler metal 36 has hardened, clamps 37 are removed, as shown in FIG. 12. Trimming tool 38, such as a router or end mill, is then run along the seam of the brazed two-part hollow frame section and flanges 35 are cut away. FIG. 13 shows a front view and FIG. 14 shows a perspective view of upper frame half-shell 32 brazed to lower frame half-shell 34 after flanges 35 have been trimmed away.

Of the three preferred embodiments discussed above, Applicants estimate that the third preferred embodiment provides the lowest cost bicycle frame manufacturing method. The same forming, brazing and trimming tools and procedures can be used for different sheet metal types (such as, titanium, aluminum, or stainless steel). Also, not only does the flange function as a temporary alignment, assembly and fixturing area, it further functions as a temporary placement area for the braze filler metal. For example, when the two part frame section is heated during the brazing process the flanges are able to contain the melted braze filler metal so that any excess melted braze filler metal is prevented from flowing onto the outer formed surfaces of the two part frame section.

Figure 17:
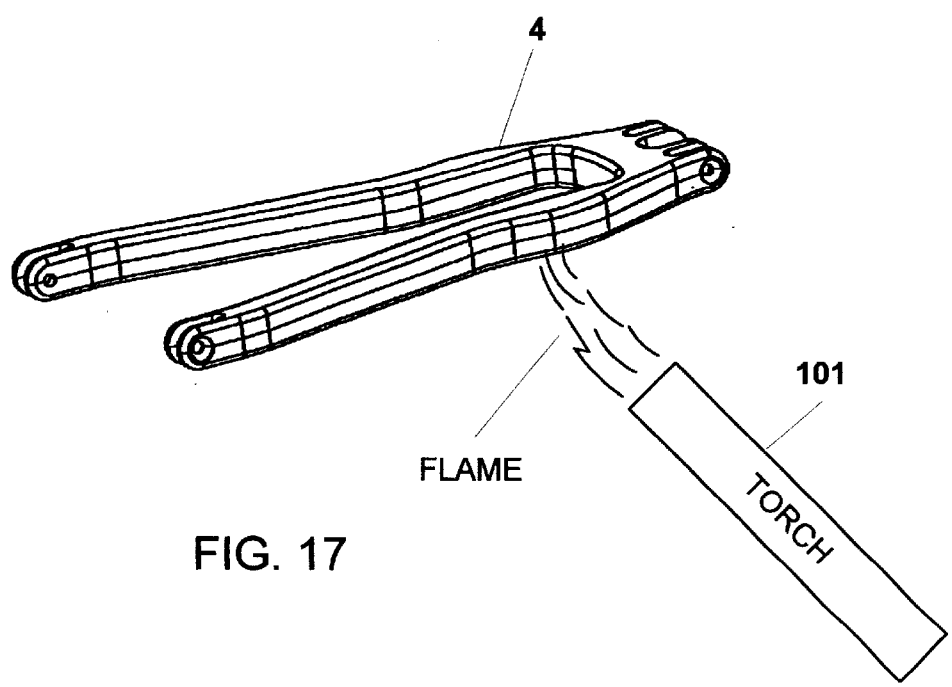
FIG. 17 shows a preferred two-part frame section being heated by a torch.

While the above description contains many specifications, the reader should not construe these as limitations on the scope of the invention, but merely as exemplifications of preferred embodiments thereof. Those skilled in the art will envision many other possible variations are within its scope. For example, although it was stated that in the second preferred embodiment that upper frame half-shell 17 and lower frame half-shell 6 are clamped together to ensure that their desired mating relationship does not alter during the brazing process, it would also be possible to braze upper frame half-shell 17 and lower frame half-shell 16 together without using a separate clamping device. Friction provided by grooved section 15 would properly hold upper frame half-shell 17 and lower frame half-shell 16 in their proper mating relationship during brazing. Although FIG. 7 shows sheet metal 30 being formed by mold 31, it is also possible to form flanged half-shells by machining them. However, the cost is much greater. Also, although FIG. 11 shows upper frame half-shell 32 and lower frame half-shell 34 clamped together, it would also be possible to crimp the flanges together. Or, the flanges could be held together with tabs. Or, the flanges could have mating holes and studs and the flanges could be snapped together. Although, FIG. 11 shows braze filler metal 36 pasted between upper frame half-shell 32 and lower frame half-shell 34, this process could be simplified by the use of a brazing sheet whereby the braze filler metal sheet is roll bonded to the base metal sheet, thereby eliminating the need for a separate time consuming step of pasting filler metal between the half-shells. An advantage of the above preferred embodiments is found in the fact that at the junction between the upper frame half-shell and the lower frame half-shell there is a smooth seam. This contrasts with welding, which by nature of the process produces a seam that has a rippled appearance. As shown in FIG. 15, it is possible to further trim the seam of the brazed two-part hollow frame section to have a seam that is at the same level as upper frame half-shell 32 and lower frame half-shell 34 so that it will be virtually invisible after painting the hollow frame section. Also, although the above embodiments discussed how to braze the upper frame half-section to the lower frame half-section by melting a filler metal after the upper frame half-section and the lower frame half-section are inserted into a hot volume, it is also possible to braze the upper frame half-section and the lower frame half-section together by melting the filler metal with hand held torch 101 as shown in FIG. 17. Disadvantages associated with torch brazing frame half-sections together are similar to the disadvantages associated with welding the frame half-sections together. For example, like welding, torch brazing formed matching half-shells along their entire seam is a time consuming and complicated process. It is considered to be delicate work, therefore torch brazers have to be highly trained or high cost robotic torch brazers are used to do an effective, consistent and esthetically acceptable job. Also, although the above preferred embodiments for brazing were discussed in relation to a bicycle frame, the above procedures could also be applied when building other types of monocoque structures. For example, these procedures could be used for building airplane wing sections or the hull or mast of a sailboat. Accordingly the reader is requested to determine the scope of the invention by the appended claims and their legal equivalents, and not by the examples which have been given.

I claim:

1. A process for making a hollow bicycle frame section utilizing brazing, comprising the steps of:
    A) fabricating at least two bicycle frame half-shells,
    B) fabricating a grooved section comprising at least two grooves,
    C) inserting a filler metal and said at least two bicycle frame half-shells in said at least two grooves to form a two-part hollow frame section,
    D) heating said two-part hollow frame section to a temperature higher than the melting temperature of said filler metal but lower than the melting temperature of said at least two bicycle frame half-shells,
    E) allowing said filler metal to melt, and
    F) allowing said filler metal to cool and harden to form a rigid joint to form said hollow bicycle frame section.

2. The process as in claim 1, further comprising the step of clamping together said at least two bicycle frame half-shells prior to heating said two-part hollow frame section.

3. The process of claim 1, wherein said heating said two-part hollow frame section is achieved by inserting said two-part hollow frame section into a hot volume.

4. The process of claim 1, wherein said heating said two-part hollow frame section is achieved by applying heat from a torch.

5. The process as in claim 1, wherein said grooved section is fabricated by extrusion.

6. The process as in claim 1, wherein said grooved section is fabricated by forming.

7. The process as in claim 1, wherein said at least two grooves are separated by an angle of approximately 180 degrees.

8. The process as in claim 1, wherein said at least two grooves are separated by an angle less than approximately 180 degrees.

9. The process as in claim 1, wherein said hollow bicycle frame section is a chain stay section.

10. The process as in claim 1, wherein said hollow bicycle frame section is a seat stay section.

11. The process as in claim 1, wherein said hollow bicycle frame section is a front portion section.

12. A process for making a hollow bicycle frame section utilizing brazing, comprising the steps of:
    A) fabricating at least two bicycle frame half-shells, wherein each of said at least two bicycle frame half-shells comprises at least one flange,
    B) placing a filler metal between said flanges of said at least two bicycle frame half-shells
    C) aligning and securing together said flanges to form a two-part hollow frame section,
    D) heating said two-part hollow frame section to a temperature higher than the melting temperature of said filler metal but lower than the melting temperature of said at least two bicycle frame half-shells,
    E) allowing said filler metal to melt,
    F) allowing said filler metal to cool and harden to form a rigid joint to form said hollow bicycle frame section, and
    G) trimming said flanges.

13. The process as in claim 12, wherein said trimming of said flanges is a partial trimming of said flanges.

14. The process as in claim 12, wherein said trimming of said flanges is a full removal of said flanges.

15. The process as in claim 12, further comprising the step of clamping together said at least two bicycle frame half-shells prior to heating said two-part hollow frame section.

16. The process of claim 12, wherein said heating said two-part hollow frame section is achieved by inserting said two-part hollow frame section into a hot volume.

17. The process of claim 12, wherein said heating said two-part hollow frame section is achieved by applying heat from a torch.

18. The process as in claim 12, wherein said hollow bicycle frame section is a chain stay section.

19. The process as in claim 12, wherein said hollow bicycle frame section is a seat stay section.

20. The process as in claim 12, wherein said hollow bicycle frame section is a front portion section.

\* \* \* \* \*